United States Patent
Welch et al.

(10) Patent No.: US 11,585,487 B2
(45) Date of Patent: Feb. 21, 2023

(54) BARGE SPUD GREASING SYSTEM

(71) Applicant: CASHMAN DREDGING AND MARINE CONTRACTING, CO., LLC, Quincy, MA (US)

(72) Inventors: Corey Welch, Lake George, NY (US); Grady Bolan, Newport, RI (US); Jay Cashman, Quincy, MA (US)

(73) Assignee: CASHMAN DREDGING AND MARINE CONTRACTING, CO., LLC, Quincy, MA (US)

( * ) Notice: Subject to any disclaimer, the term of this patent is extended or adjusted under 35 U.S.C. 154(b) by 0 days.

(21) Appl. No.: 17/514,017

(22) Filed: Oct. 29, 2021

(65) Prior Publication Data
US 2022/0136649 A1 May 5, 2022

Related U.S. Application Data

(60) Provisional application No. 63/107,859, filed on Oct. 30, 2020.

(51) Int. Cl.
*B63B 21/26* (2006.01)
*E02B 17/02* (2006.01)
*F16N 11/00* (2006.01)
*B63B 21/50* (2006.01)
*E02B 17/00* (2006.01)

(52) U.S. Cl.
CPC .............. *F16N 11/00* (2013.01); *B63B 21/26* (2013.01); *B63B 21/50* (2013.01); *E02B 17/021* (2013.01); *E02B 2017/0056* (2013.01); *F16N 2210/06* (2013.01)

(58) Field of Classification Search
CPC ......... E02F 9/065; E02F 9/062; E02F 3/8808; E02B 2017/0056; E02B 17/021; B63B 2021/501; B63B 21/50; B63B 21/26; F16N 11/00; F16N 2210/06
See application file for complete search history.

(56) References Cited

U.S. PATENT DOCUMENTS 1,915,331 A    6/1933  Neveling
3,656,449 A *  4/1972  Mead ....................... E02F 9/062
                                                                 440/36

(Continued)

OTHER PUBLICATIONS

Written Opinion of the International Searching Authority dated Feb. 4, 2022.

*Primary Examiner* — Benjamin F Fiorello
(74) *Attorney, Agent, or Firm* — Jacob M. Ward; Ward Law Office LLC

(57) ABSTRACT

A spud greasing system includes a spudwell and a spud configured to slidingly engage with the spudwell between a deployed position and an undeployed position. The spud includes an access window configured to align and correspond with a window of the spudwell when the spud is in the undeployed position. A sheave assembly is mounted in the spud and includes a first sheave and a second sheave rotationally mounted proximate a front end and a back end of the housing, respectively. When the spud is in the undeployed position, a grease supply is configured to be selectively connected to a supply pipe through the window and access window of the spudwell and spud thereby supplying grease to the first sheave of the sheave assembly without removing the spud from the spudwell.

20 Claims, 8 Drawing Sheets

(56) References Cited

U.S. PATENT DOCUMENTS

| | | |
|---|---|---|
| 10,287,748 B1* | 5/2019 | Wetta ........................ E02F 9/22 |
| 11,352,763 B2* | 6/2022 | Wilson, Sr. ........... B60F 3/0038 |
| 2009/0126237 A1* | 5/2009 | Clymans ................. E02F 9/062 |
| | | 37/317 |
| 2013/0089397 A1 | 4/2013 | Downing et al. |
| 2017/0089037 A1* | 3/2017 | Knol ...................... B63H 19/08 |
| 2018/0112373 A1 | 4/2018 | Hout |
| 2019/0195060 A1* | 6/2019 | Van Duivendijk ..... E21B 3/022 |
| 2020/0181992 A1* | 6/2020 | Wijning ................ E21B 19/143 |

* cited by examiner

BARGE SPUD GREASING SYSTEM

CROSS-REFERENCE TO RELATED APPLICATIONS

This application claims priority to and the benefit of U.S. Provisional Application No. 63/107,859, filed on Oct. 30, 2020. The entire disclosure of the above application is incorporated herein by reference.

FIELD

The present disclosure relates to the marine industry, and more particularly, to spuds used to anchor barges.

BACKGROUND

This section provides background information related to the present disclosure which is not necessarily prior art.

Spud barges are heavy duty vessels that can transport over fifteen (15) times the amount of materials as a rail car, and sixty (60) times as much as a truck. A typical spud barge is mostly comprised of a large, flat deck. Due to their size and stability, spud barges provide excellent solid work platforms for nearshore and offshore projects. Similarly, spud barges have ample room for storing, transporting, and providing a working platform for construction equipment, such as cranes and excavators. Spud barges have spuds and spudwells. The spuds include vertical members (e.g., shafts), usually made of steel, which are used to anchor or moor a barge in a particular area and provide stability. The spuds can be driven into the earth (e.g., seafloor, riverbed, lake floor, etc.) beneath the spud barge. Once engaged in the earth, the spuds can help the barge maintain a location despite current, wind, or other external forces, such as on-deck machinery acting on the spud barge. Desirably, this can protect the spud barge from movement due to currents, wind, and use of machinery on the vessel. The spudwells, also referred to as spud "pockets," include vertical sleeves that receive the spuds to attach the spud to the spud barge. The spudwell keeps the spud secure and in place and allows controlled vertical movement of the spuds. There can be various numbers of spuds and therefore spudwells on a given barge. The number of spuds and spudwells on a given barge depend on several factors which are unique to each project and barge arrangement.

Spuds can be raised and lowered using a series of pulleys and wires or cables. These pulleys and wires/cables constantly need to be maintained via greasing to ensure smooth continuous operation. Traditional methods of greasing the system involve floating a separate crane on a separate vessel alongside the barge in question, attaching the crane to the spuds, then hoisting the spuds almost entirely out of the spudwell to an appropriate height such that access can be granted to all greasing locations. Undesirably, this process can be time consuming, work intensive, and expensive. Furthermore, this process can also serve to interrupt the normal flow of construction or production activities as the supplementary equipment necessary for the traditional maintenance (greasing) may not be readily available or there could be accessibility constraints. The barge may therefore need to either breakaway from the work or halt operations to satisfy the schedule of the ancillary equipment. In addition, sometimes the area around the barge can be limited (e.g., where the barge is located in a narrow canal), which does not facilitate having a separate vessel carrying the crane alongside the barge. On occasion, it has been observed that this required maintenance is not performed because of the difficulty of performing the task, the availability of the ancillary hoisting equipment, project schedule constraints or some combination of all of these items.

There is a continuing needed for a barge spud greasing system and method that permits spuds to be greased without having to be removed completely from a spudwell. Desirably, the system and method do not require a separate crane or moving from the works location.

SUMMARY

In concordance with the instant disclosure, a barge spud greasing system that permits spuds to be greased without having to be removed completely from a spudwell, which does not require a separate crane, and can be done in any location has been surprisingly discovered.

The present technology can be used for spud barges and other applications in the marine industry. However, it should be appreciated that a skilled artisan can adapt the present technology to other industries, within the scope of this disclosure.

A spud greasing system is provided with a spudwell including a sleeve defining a window, a spud configured to be disposed in the sleeve of the spudwell, the spud including an access window, and a sheave assembly disposed in the spud proximate the access window. The sheave assembly includes a housing, a sheave configured to be rotationally mounted in the housing, a supply pipe configured to be disposed on the housing, and a grease fitting configured to be in fluid communication with the supply pipe and the sheave. The grease fitting can be configured to transport grease from the supply pipe to the sheave. The spud greasing system can include a winch system having a guide pulley rotationally mounted on the spudwell and a cable, wherein the guide pulley is rotationally coupled to the sheave via the cable and the spud is configured to vertically move via the winch system between a deployed position and an undeployed position. When the spud is in the undeployed position, the access window of the spud aligns and corresponds with the window of the spudwell such that the sheave of the sheave assembly is accessible via the access window of the spud and the window of the spudwell.

In one example, the spudwell includes a barge side and a water side, and the window of the sleeve is configured to face the water side.

In another example, the spud greasing system further includes a second sheave configured to be rotationally mounted in the housing of the sheave assembly, wherein the second sheave is rotationally coupled to the guide pulley and the sheave via the cable. In this example, the sheave can be rotationally mounted at the front end of the housing, and the second sheave can be rotationally mounted at the back end of the housing. The spud greasing system can include a second grease fitting in fluid communication with the second sheave, where the second grease fitting can be configured to receive grease from a grease supply and feed the grease to the second sheave. The spud greasing system can include a second grease fitting configured to receive grease from a grease supply and feed the grease to the second sheave, wherein the second grease fitting includes a first end disposed at the back end of the housing, and when the spud is in the undeployed position, the grease supply is configured to be selectively connected to the first end of the second grease fitting.

In another example, the sheave assembly can further include a protrusion configured to receive and secure the grease fitting to the housing. The supply pipe can extend along an upper portion of the housing and partially down the second side of the housing.

In another example, spud defines a cylindrical shape that can have a diameter of at least one of 12 inches, 20 inches, or 24 inches.

In another embodiment, a spud greasing system includes a spudwell defining a window, a spud configured to slidingly engage with the spudwell between a deployed position and an undeployed position, the spud including an access window configured to align and correspond with the window of the spudwell, and a sheave assembly mounted in the spud. The sheave includes a housing, a first sheave configured to be rotationally mounted proximate a front end of the housing, a second sheave configured to be rotationally mounted proximate a back end of the housing, a grease fitting configured to feed grease to the first sheave, a second grease fitting configured to feed grease to the second sheave, and a supply pipe configured to transport grease from a grease supply to the grease fitting and the second grease fitting. The supply pipe includes a first end disposed proximate the back end of the housing and a second end connected to the grease fitting thereby permitting transporting the grease. When the spud is in the deployed position, the grease supply is configured to be selectively connected to the first end of the supply pipe through the window of the spudwell and the access window of the spud thereby supplying grease to the first sheave of the sheave assembly without removing the spud from the spudwell.

In one example, the spud greasing system can include a winch system mounted to the spudwell, the winch system including a winch drum configured to wind a cable. The winch system can include a guide pulley rotationally mounted on the barge side of the spudwell, the guide pulley configured to be rotationally coupled to the first sheave and the second sheave via the cable and the spud is configured to vertically move via the winch system between the deployed position and the undeployed position.

In another example, the sheave assembly further includes a protrusion defining a channel configured to receive and secure the grease fitting to the housing.

In other various examples, the sheave assembly can include a protrusion defining a second channel configured to receive and secure the second grease fitting to the housing. The sheave assembly can include a pipe having a first fitting end and a second fitting end, the first fitting end attached to the grease fitting and the second fitting end attached to the second grease fitting thereby permitting the grease fitting to be in fluid communication with the second grease fitting. The sheave assembly can include a protrusion defining a tunnel and a pipe disposed in the tunnel, the pipe configured to connect the grease fitting and the second grease fitting thereby permitting grease to travel to the second sheave. The supply pipe can extend along an upper portion of the housing and partially down the second side of the housing. The first end of the supply pipe can include an attachment device configured to be attached to the grease supply. Each one of the first sheave and the second sheave can include a cavity configured to receive the grease.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
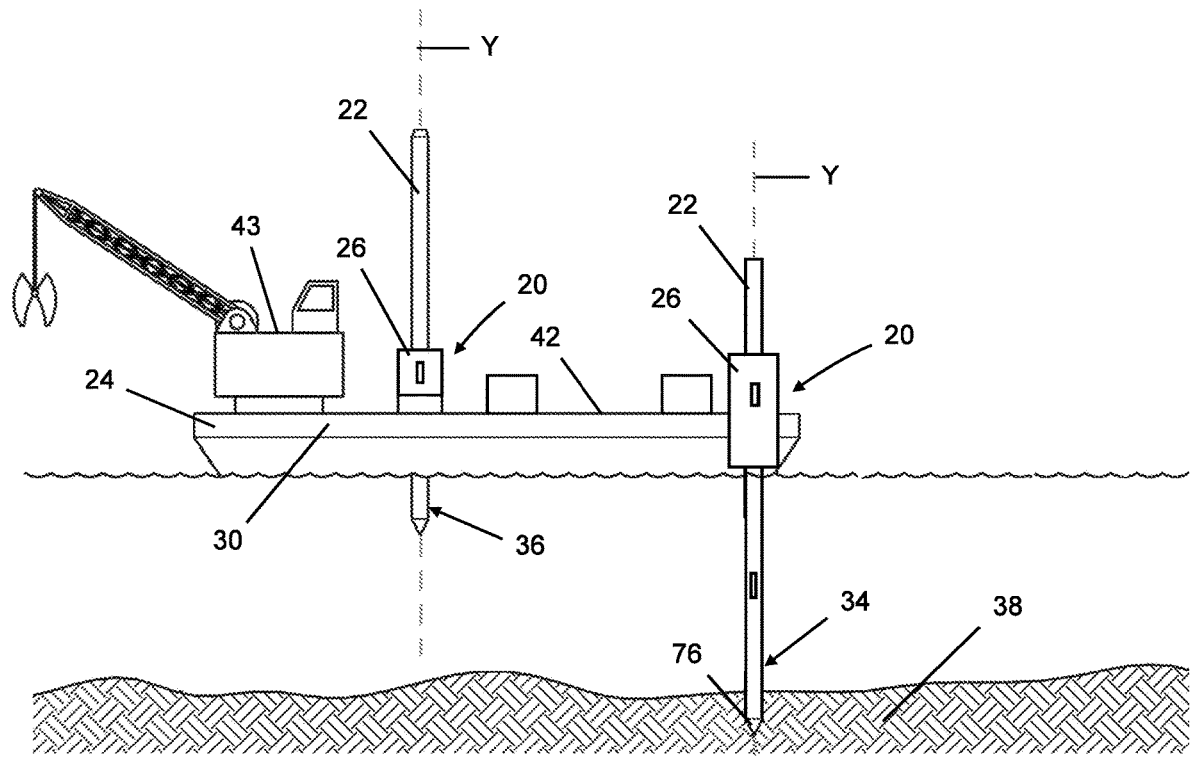
FIG. 1 is a schematic representation of a spud greasing system secured to a spud barge, according to one embodiment of the present disclosure, and further depicting a spud in an undeployed position and a spud in a deployed position.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9,1-8,1-3,1-2,2-10,2-8,2-3,3-10,3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Figure 2:
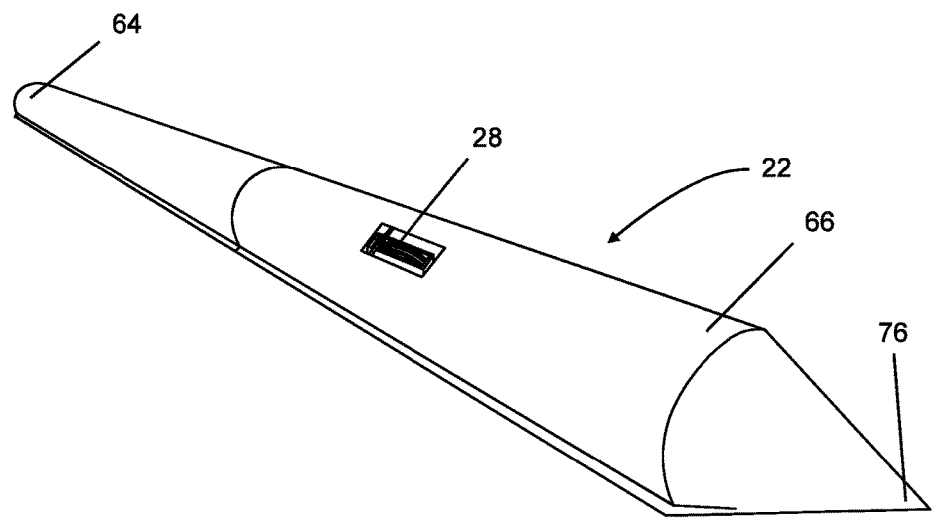
FIG. 2 is a bottom perspective view of a spud and a sheave assembly disposed therein according to the present disclosure.

Referring to FIGS. 1-2, a spud greasing system 20 for greasing a spud 22 is shown. The spud 22 is configured to anchor a spud barge 24 to a predetermined location. The spud barge 24 can be adapted as a work platform 42 for nearshore and offshore projects. The spud barge 24 can also provide storage and transportation, as well as an operating area for construction equipment, such as cranes and excavators 43. It should be appreciated that a skilled artisan can employ the spud greasing system 20 on other types of floating vessels and other structures, while still remaining within the scope of the present disclosure. The spud greasing system 20 includes a spud 22 disposed in a spudwell 26 and a sheave assembly 28 mounted in the spud 22.

Figures 3, 4:
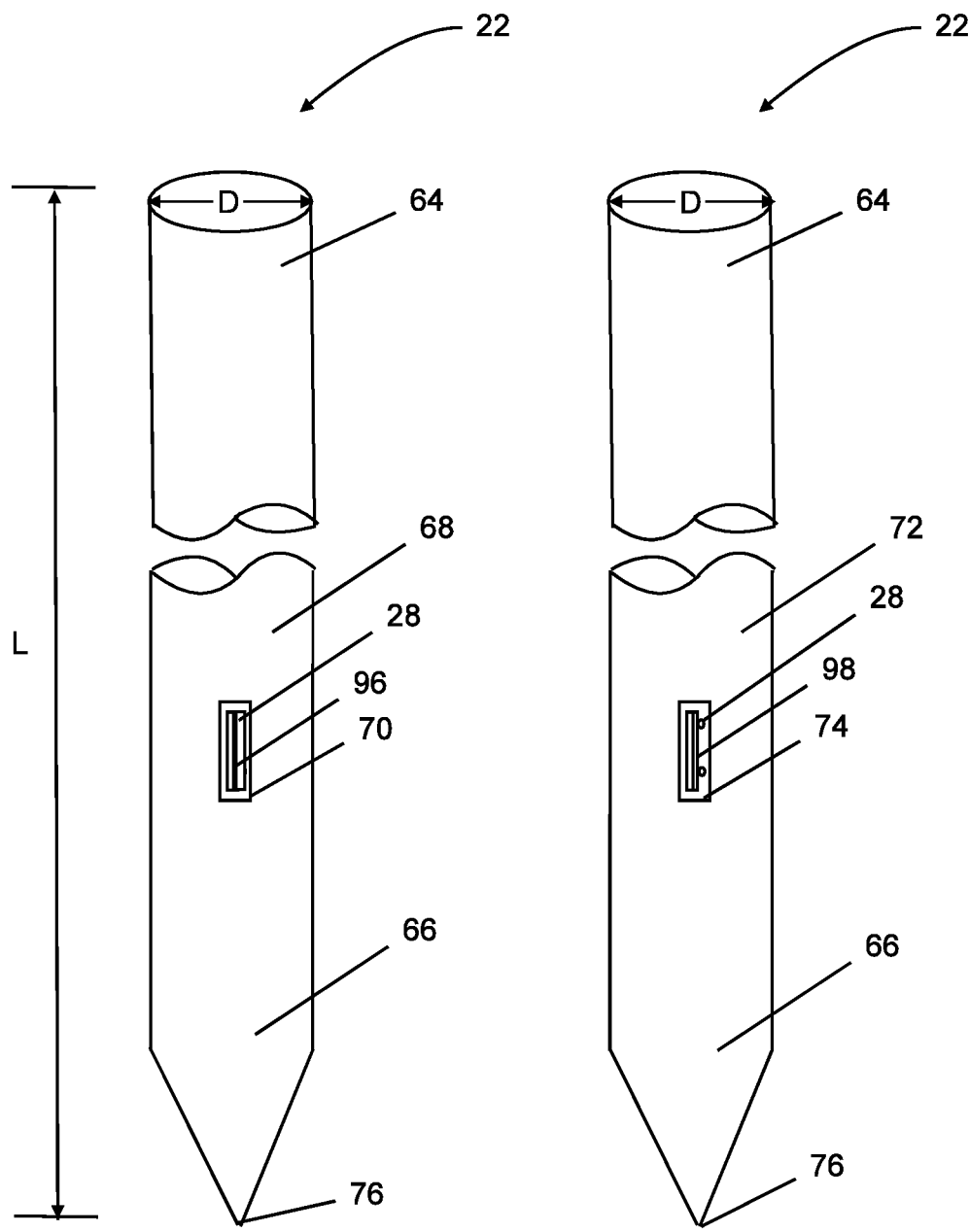
FIG. 3 is a front elevation view of the spud of FIG. 2.
FIG. 4 is a back elevation view of the spud of FIG. 2.

Referring to FIGS. 3-4, and continued reference to FIG. 2, the spud 22 includes a top end 64, a bottom end 66, a front side 68 (FIG. 3) defining an opening 70, and a back side 72 (FIG. 4) defining an access window 74. In one example, the opening 70 and the access window 74 are opposed one another thereby creating a through hole in the spud 22. In certain examples, the opening 70 and access window 74 can be disposed six feet (6') from the bottom end 66 of the spud 22. It should be appreciated that a skilled artisan can scale the location of the opening 70 and access window 74.

The spud 22 is orientated within the spudwell 26 such that the front side 68 of the spud 22 faces the platform 42 of the spud barge 24 and the back side 72 of the spud 22 faces the open water 44. In one example, the spud 22 has a cylindrical shape to facilitate insertion of the spud 22 into the earth floor 38. The spud 22 can have a varying length and diameter depending on application requirements. In non-limiting examples, the spud 22 can have a diameter D of about 12 inches, about 20 inches, or about 24 inches, and a length L of about 40 feet or 60 feet. It should be appreciated that one skilled in the art can select other suitable shapes and can scale the dimensions of the spud 22 to conform to application requirements, as desired. In addition, the spud 22 can be manufactured from steel, however, a skilled artisan can employ other materials for the spud 22, within the scope of this disclosure.

Figure 5:
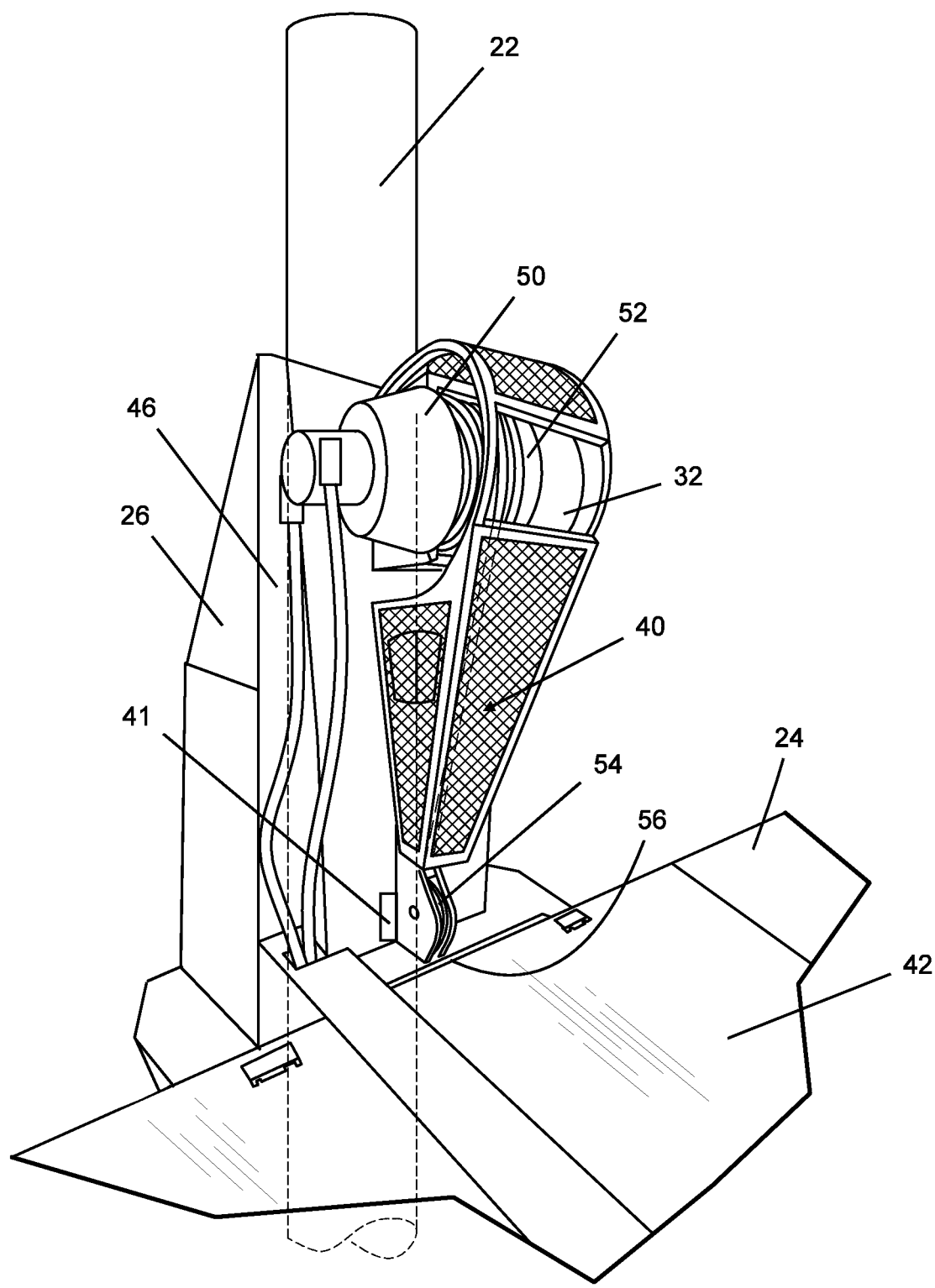
FIG. 5 is a front perspective view of a spud greasing system according to the present disclosure.
Figure 6:
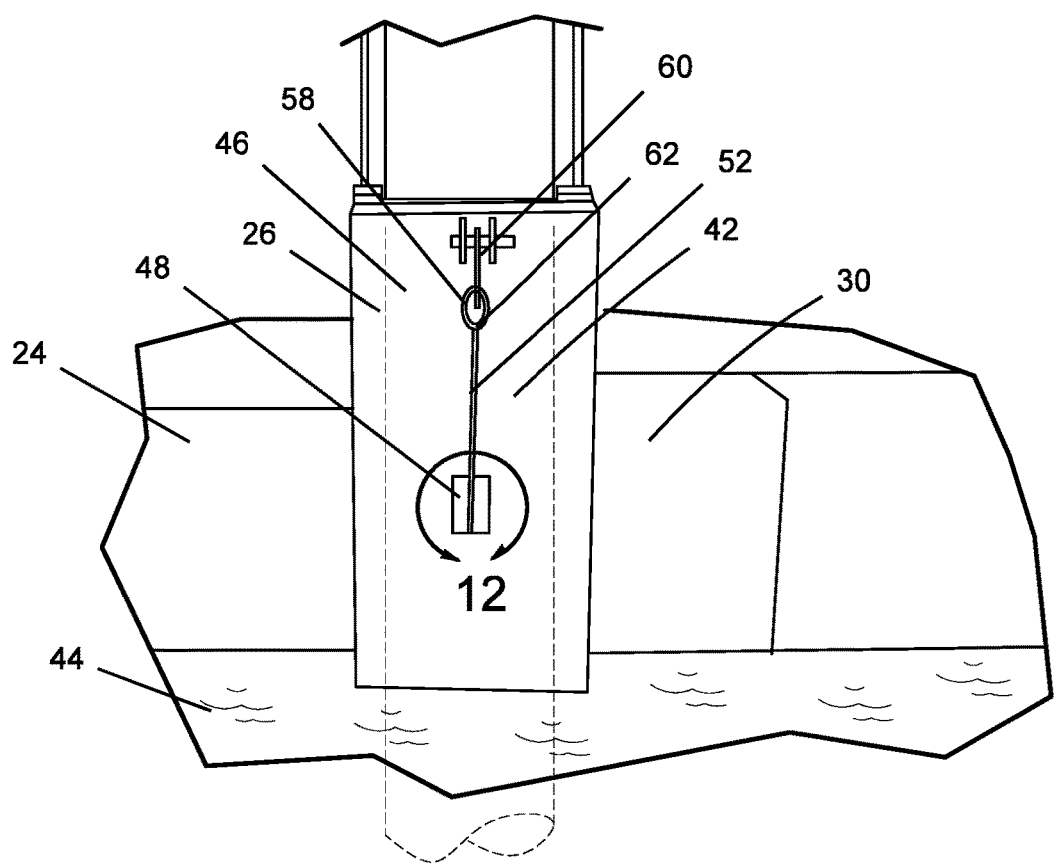
FIG. 6 is a back elevation view of a spud greasing system according to the present disclosure.
Figure 7:
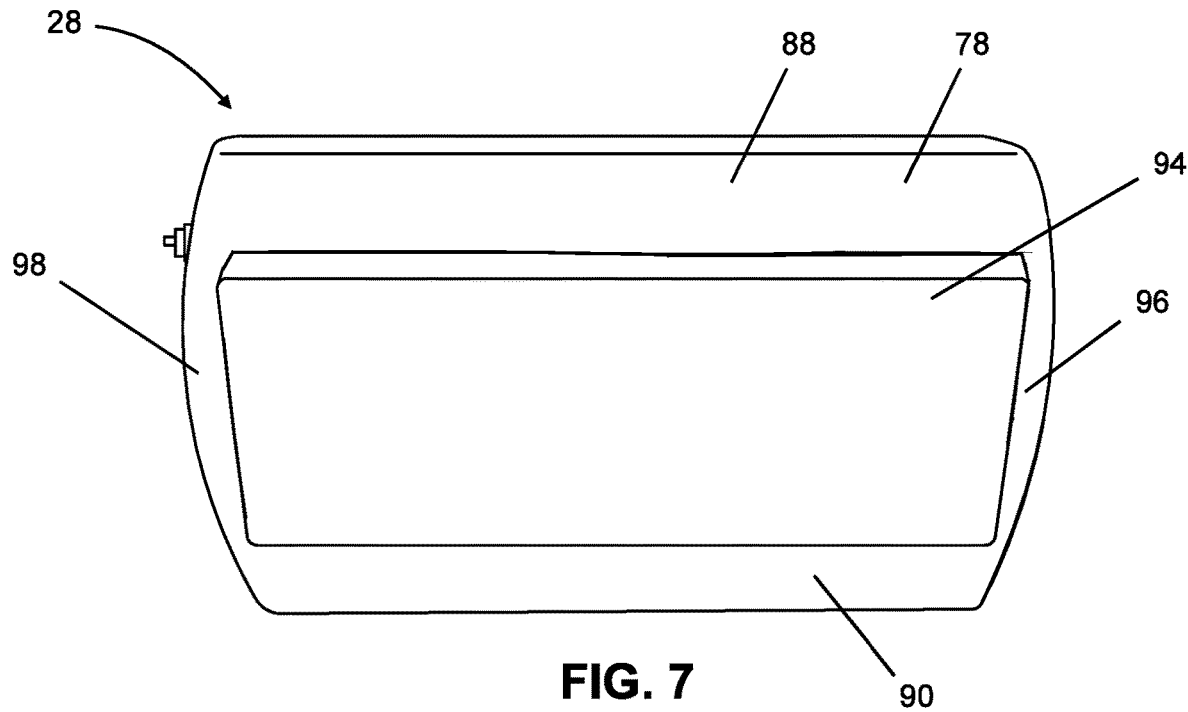
FIG. 7 is a back elevation view of a sheave assembly according to the present disclosure.

Referring to FIGS. 5-6, the spudwell 26 is secured to a side 30 of the spud barge 24 and defines a sleeve 46 configured to receive and secure the spud 22. The sleeve 46 has a cylindrical shape corresponding to the cylindrical shape of the spud 22 such that the spud 22 slidingly engages with the sleeve 46 about a vertical axis Y between the deployed position 34 and undeployed position 36. More specifically, the spudwell 26 includes a winch and pulley system 32 adapted to facilitate vertical movement of the spud 22 relative to the spud barge 24 about a substantially vertical axis Y. The vertical movement allows for the spud 22 to move between the deployed position 34 and undeployed position 36.

The winch and pulley system 32 is disposed on the barge side 40 of the spudwell 26 and includes a winch drum 50 configured to wind a wire or cable 52, which is guided by a pulley system having a series of pulley wheels/sheaves. The winch drum 50 can be powered manually by air, electricity, or hydraulics wherein a motor applies power on the gears and thereby the winch drum 50 for lifting and lowering operations. In one example, as shown in FIG. 5, the winch and pulley system 32 includes a guide pulley 54 rotationally mounted at the barge side 40 of the spudwell 26 proximate an edge 56 of the spud barge 24. The cable 52 runs over the guide pulley 54 and extends into the spudwell 26 via an opening 41 and thereby into the spud 22 to run over a sheave of the sheave assembly 28, which is described in greater detail below. The cable 52 exits the spudwell 26 via the window 48 disposed on the waterside 42 of the sleeve 46. An end 60 of the cable 52 can include a hook 58 configured to engage a latch 62 disposed on the waterside 42 of the sleeve 46 to affix the end 62 of the cable 52 to the spudwell 26 to facilitate vertical movement of the spud 22 relative to the spud barge 24 thereby permitting the spud 22 to move between the deployed position 34 and undeployed position 36.

Referring back to FIG. 1, in the deployed position 34, the bottom end 66 of the spud 22 is driven into the earth floor 38 at a predetermined area beneath the spud barge 24 thereby anchoring the spud barge 24 in place. The bottom end 66 of the spud 22 may include a tip 76 configured to facilitate driving the spud 22 into the earth floor 38. In the undeployed position 26, the spud 22 is raised from the earth floor 38 such that the spud barge 24 is capable of freely moving on the water, and furthermore, permits access to the sheave assembly 28 for greasing without requiring the removal of the spud 22 from the spudwell 26. It should be appreciated that a person skilled in the art can select different positions for the spud 22 to move between while still remaining within the scope of the present disclosure.

With reference to FIGS. 5-6, the spudwell 26 includes a barge side 40 (FIG. 5) that is accessible when a user is on the platform 42 of the spud barge 24 and a water side 42 (FIG. 6) that is accessible from the water 44. For example, the user can be on a separate floating vessel adjacent the spud barge 24 to access the waterside 42 of the spudwell 26. As best shown in FIG. 6, the sleeve 46 of the spudwell 26 defines a window 48 disposed on the waterside 42. The window 48 is configured to align and correspond with the access window 74 of the spud 22 thereby permitting the user to access the sheave assembly 28 disposed within the spud 22 when the spud 22 is in the undeployed position 36, which is described in greater detail below.

Figure 8:
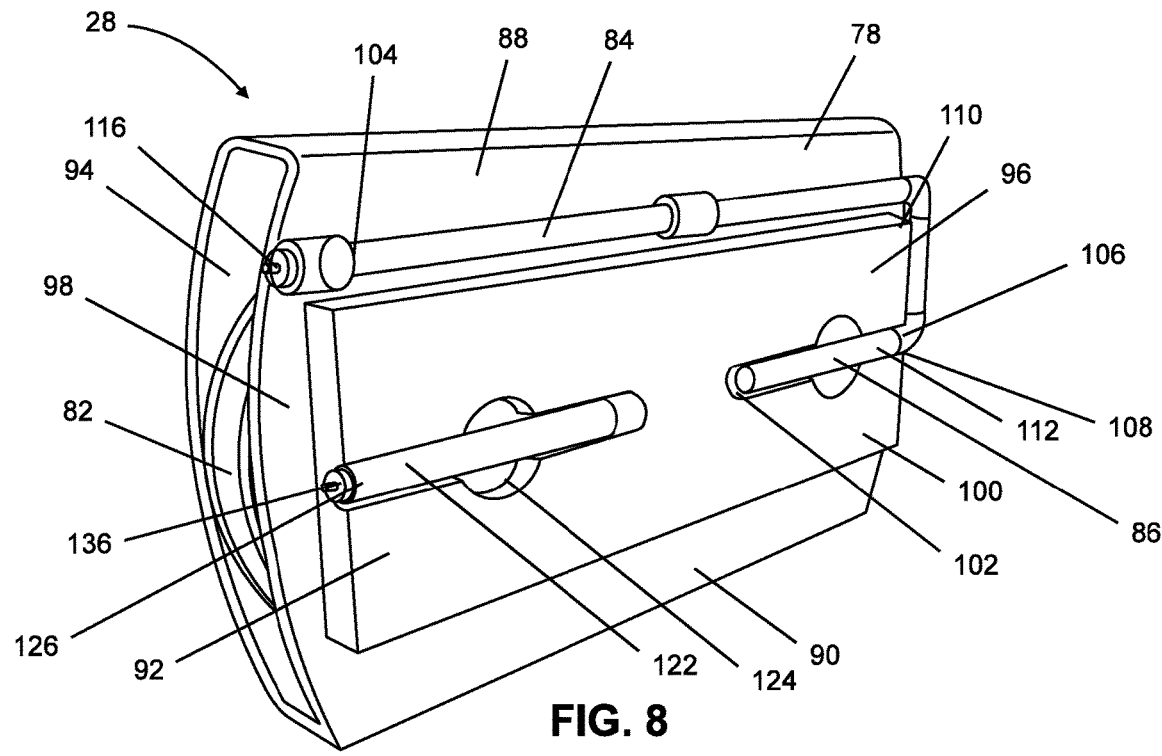
FIG. 8 is a side perspective view of a sheave assembly according to the present disclosure.
Figure 9:
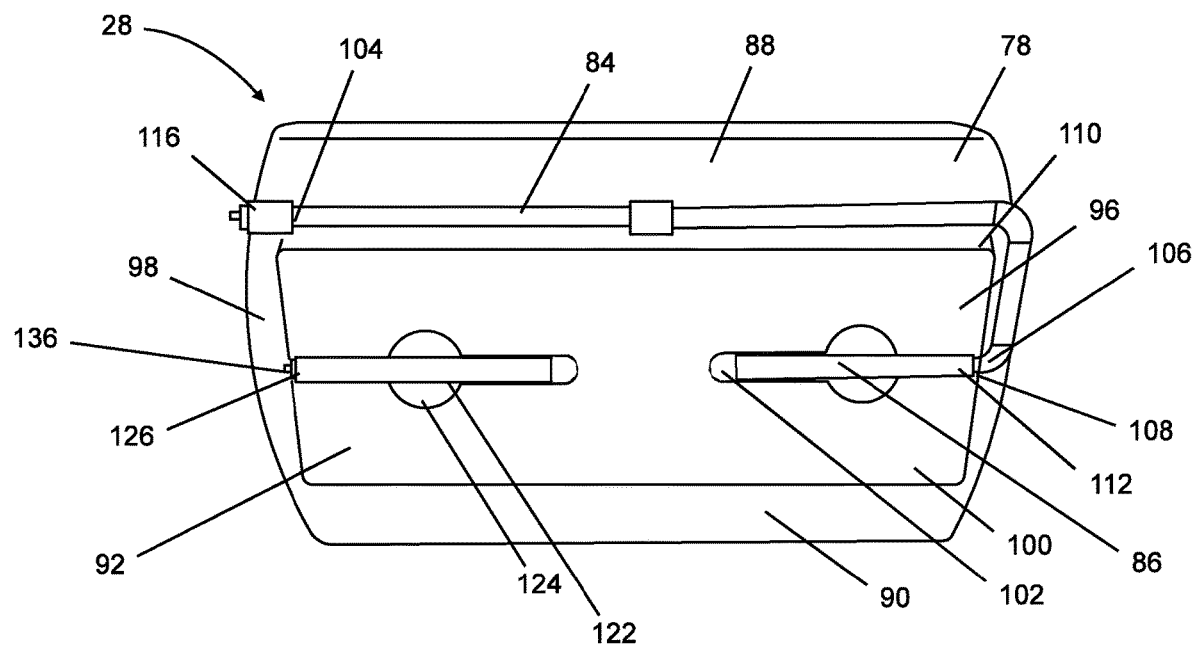
FIG. 9 is a top perspective view of the sheave assembly of FIG. 8.
Figure 10:
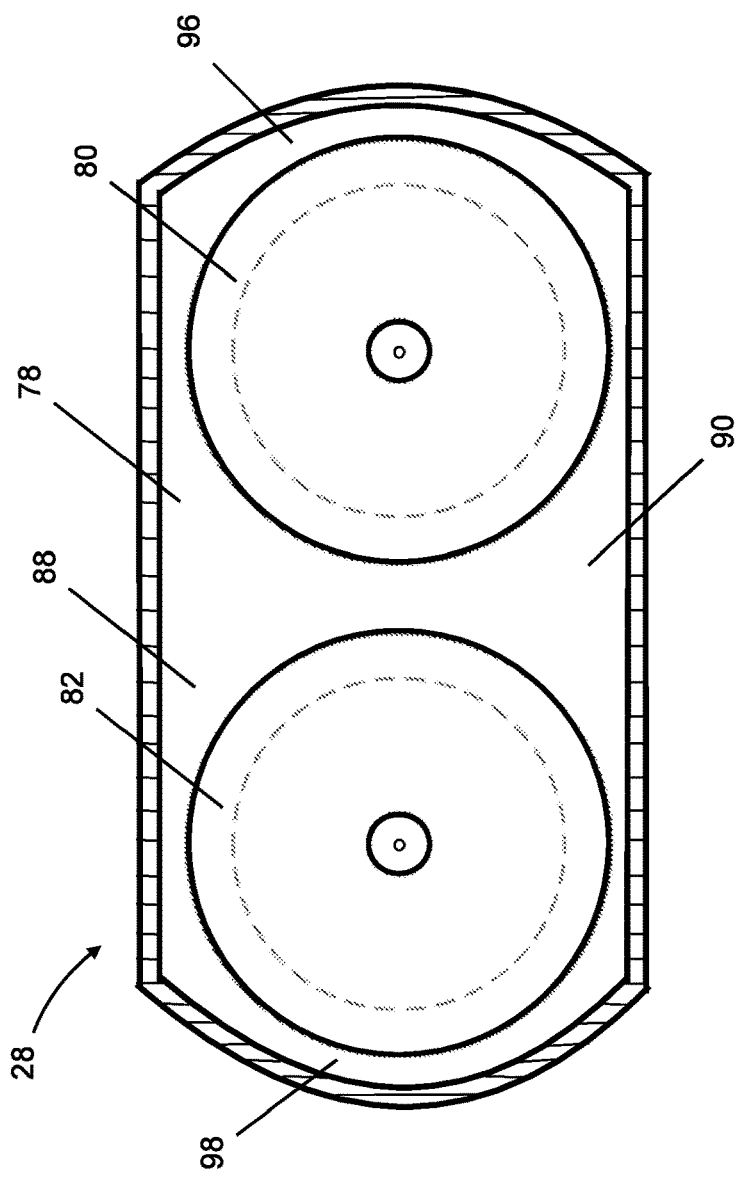
FIG. 10 is a side cross-sectional view of the sheave assembly of FIG. 8.

Referring to FIGS. 7-11, the sheave assembly 28 includes a housing 78, a first sheave 80 and a second sheave 82 (FIG. 10) disposed in the housing 78, a supply pipe 84 including a first end 104 and a second end 106, and a grease fitting 86 attached to the second end 106 of the supply pipe 84. The housing 78 includes an upper portion 88, a lower portion 90, a first side 92, a second side 94, a front end 96, and a back end 98. The housing 78 can be substantially hollow with the front end 96 and back end 98 being open, wherein the housing 78 is configured to house the first and second sheaves 80, 82. In one example, as best shown in FIG. 10, the first sheave 80 is rotationally mounted proximate the front end 96 of the housing 78 and the second sheave 82 is rotationally mounted adjacent the first sheave 80 proximate the back end 98 of the housing 78. The sheave assembly 28 is configured to be disposed in the spud 22 such that the front end 96 of the housing 78 (and thus the first sheave 80) is visible/accessible through the opening 70 on the front side 68 of the spud 22 (FIG. 3) and the back end 98 (and thus the second sheave 82) is visible/accessible through the access window 74 of the spud 22 (FIG. 4).

The first sheave 80 and the second sheave 82 can be rotationally coupled to the guide pulley 54 disposed on the spudwell 26 via the cable 52. As described above, the cable 52 is wound around the winch drum 50, runs over the guide pulley 54, and extends into the spudwell 26 and the spud 22 via the opening 70 on the front side 68 of the spud 22. The cable 52 enters the open front end 96 of the sheave assembly 28, runs over and wraps around the first and second sheaves 80, 82, exits the open back end 98 of the sheave assembly 28, and finally exits the spud 22 and spudwell 26 via the access window 74 of the spud 22 and the opening 41 of the spudwell 26. The motor of the winch and pulley system 32 powers the winch drum 50 to rotate and wind or unwind the cable 52, which acts on the guide pulley 54 and thus the first and second sheaves 80, 82 thereby facilitating lifting or lowering operation of the spud 22.

In operation, the unwinding and winding of the cable 52 allows the spud 22 to move between the deployed position 34 and undeployed position 36, respectively. During unwinding of the cable 52, the amount of cable 52 wrapped around the winch drum 50 decreases, causing the length of the cable 52 between the guide pulley 54 and the first and second sheaves 80, 82 to increase. As the length of the cable 52 increases, the spud 22 is vertically lowered about the vertical axis Y toward the earth floor 38 until the spud 22 is in the deployed position 34; e.g., until the spud 22 is driven into the earth floor 38 thereby anchoring the spud barge 24 in place. During winding of the cable 52, the amount of cable 52 wrapped around the winch drum 50 increases causing the length of the cable 52 between the guide pulley 54 and the first and second sheaves 80, 82 to decrease. As the length of the cable 52 decreases, the spud 22 is vertically lifted about the vertical axis Y toward the spud barge 24 until the spud 22 is in the undeployed position 36; e.g., until the spud 22 is not longer engaged with the earth floor 38 thereby allowing the spud barge 24 to freely move about the water.

Figure 12:
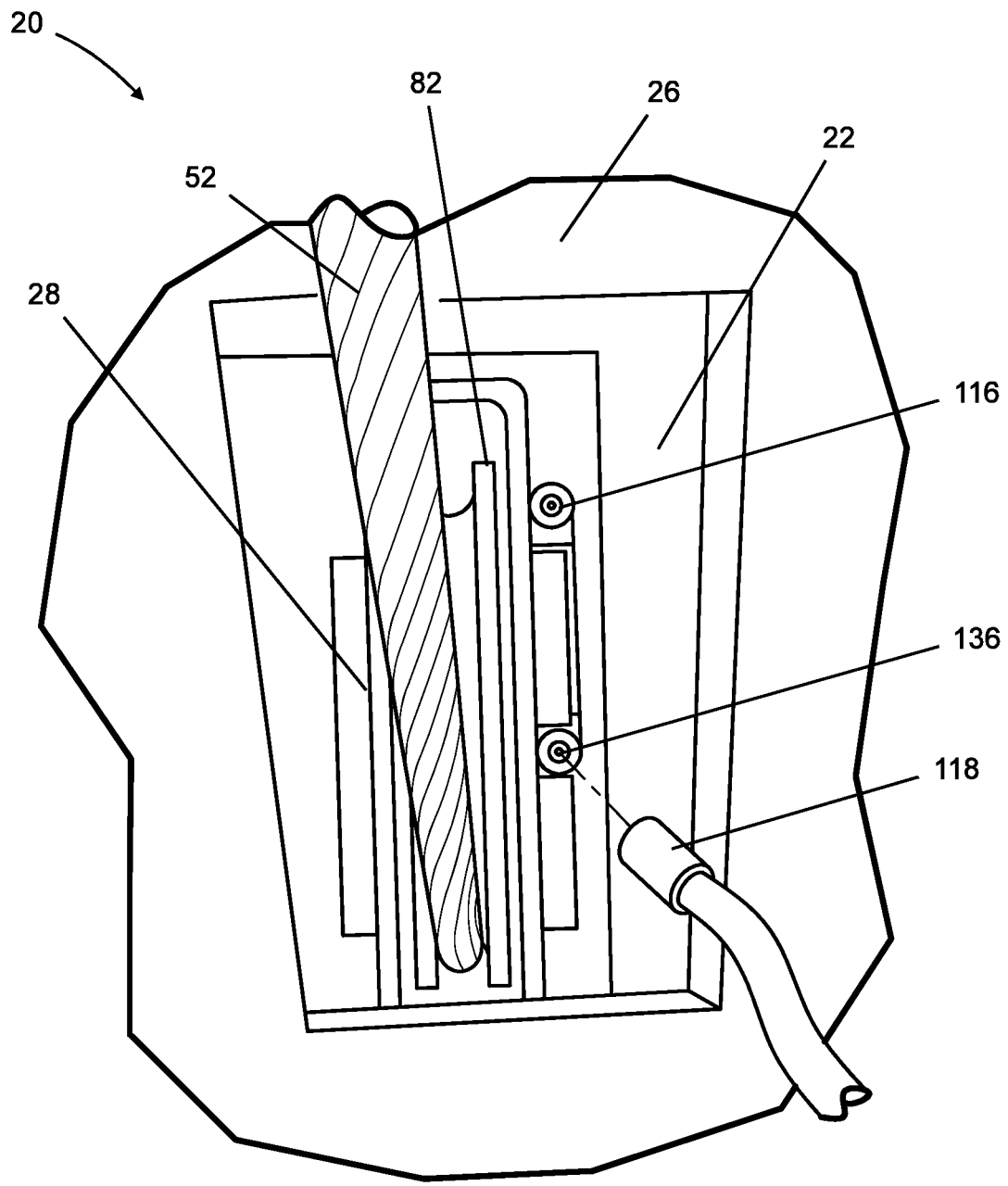
FIG. 12 is a close-up view of a spud having a sheave assembly disposed therein and the spud disposed in a spudwell taken from cutout 12 of FIG. 6.

With reference to FIGS. 8-9, the sheave assembly 28 includes a protrusion 100 centrally located on the first side 92 of the housing 78. In one example, a channel 102 is formed through the protrusion 100 and can be configured to receive and secure the grease fitting 86 attached to the second end 104 of the supply pipe 84 to the housing 78. The grease fitting 86 can be disposed adjacent the first sheave 80 and configured to feed grease from the supply pipe 84 to the first sheave 80, wherein the supply pipe 84 extends along the upper portion 88 of the housing 78 above the protrusion 100 and extends from the back end 98 toward the front end 96 and partially down the second side 94 of the housing to a mouth 108 of the channel 102. More specifically, the supply pipe 84 defines a path beginning at the back end 98 of the housing 78, following an upper perimeter of the protrusion 100 toward the front end 96 of the housing 78, curving around an upper front corner 110 of the protrusion 100 and extending down the front end 96 of the housing 78, and ending at the mouth 108 of the channel 102. The second end 106 of the supply pipe 84 can be attached to a first end 112 of the grease fitting 86 that is disposed in the channel 102 of the protrusion 100. The first end 104 of the supply pipe 84 includes an attachment device 116, such as a grease nipple, that can be selectively connected to a grease supply 118 (FIG. 12). In certain examples, the grease supply 118 is a grease gun. However, it should be appreciated that a one skilled in the art can employ different types of machines or devices for the grease supply 118, within the scope of this disclosure.

When the spud 22 is in the undeployed position 36, the access window 74 of the spud 22 is configured to align with the window 48 disposed on the waterside 42 of the spudwell 26 thereby permitting access to the back end 98 of the sheave assembly 28. As such, the user can connect the grease supply 118 to the supply pipe 84 via the attachment device 116 to feed grease into the supply pipe 84 thereby allowing grease to travel through the supply pipe 84 and into the grease fitting 86. The grease fitting 86 is configured to feed grease to the first sheave 80 via a cavity 120 (FIG. 11) to lubricate components of the first sheave 80. Desirably, greasing the first sheave 80 can militate against potential hazards, such as the cable 52 breaking from friction.

Figure 11:
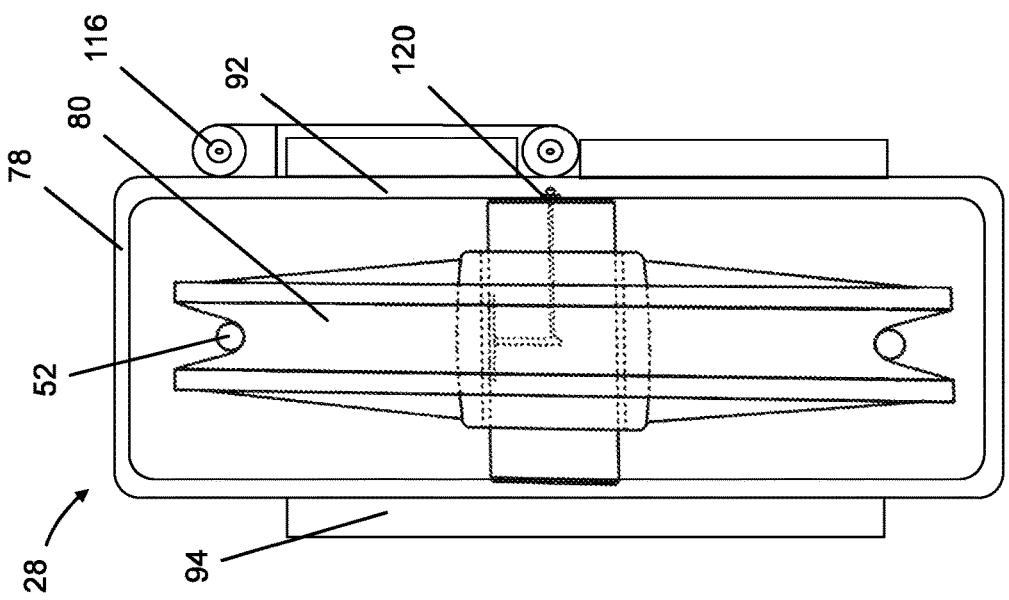
FIG. 11 is a back view of the sheave assembly of FIG. 8, depicting a sheave disposed in a housing.

With continued reference to FIGS. 8-9, in one example, the sheave assembly 38 further includes a second grease fitting 122 disposed in a second channel 124 formed in the protrusion 100. The second grease fitting 122 includes a first end 126 disposed at the back end 98 of the housing 78. The first end 126 of the second grease fitting 122 including an attachment device 136, such as a grease nipple, configured to be selectively connected to the grease supply 118. The grease supply 118 can feed grease to the second grease fitting 122 via the attachment device 136. The second grease fitting 122 can be disposed adjacent the second sheave 82 and is configured to feed grease to the second sheave 82 to lubricate components of the second sheave 82. The second grease fitting 122 can feed grease to the second sheave 82 through a cavity (not shown), similar to cavity 120 (FIG. 11). Likewise, greasing the second sheave 82 can militate against potential hazards, such as the cable 52 breaking from friction.

Figure 13:
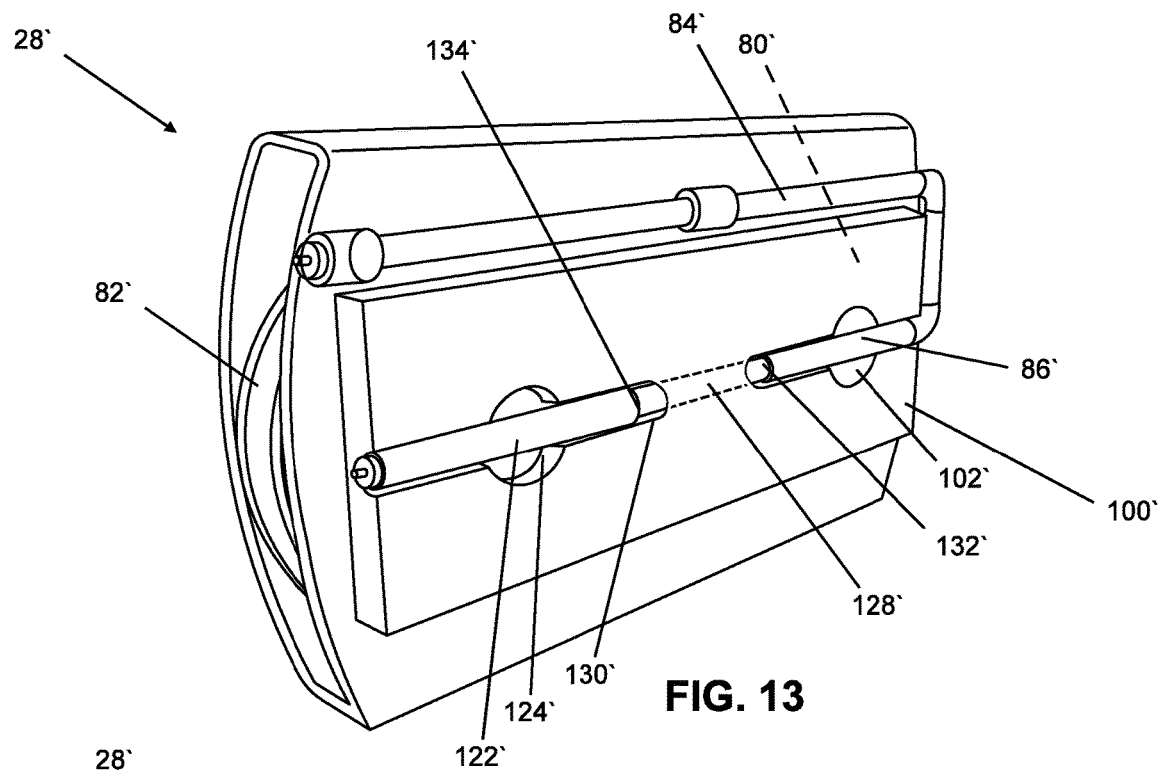
FIG. 13 is a side perspective view of a sheave assembly according to another embodiment of the present disclosure.
Figure 14:
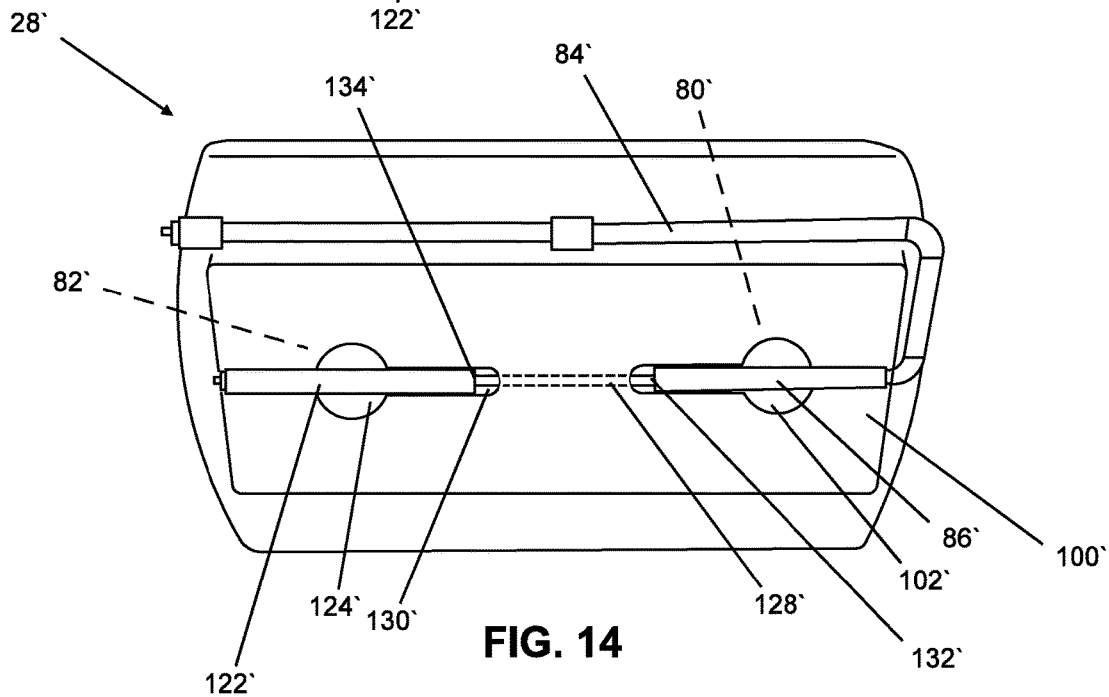
FIG. 14 is a top perspective view of the sheave assembly of FIG. 13.

Referring to FIGS. 13-14, in another embodiment, the grease fitting 86' and second grease fitting 122' are in fluid communication via a pipe 128' thereby permitting grease to be supplied to both the first and second sheaves 80', 82' via the supply pipe 84'. In FIGS. 13-14, like or related structure to that shown in FIGS. 1-12 is identified with the same reference number and a prime symbol (') for purposes of clarity.

As shown in FIGS. 13-14, the protrusion 100' defines a tunnel 130' connecting the channel 102' and the second channel 124'. The pipe 128' is disposed through the tunnel 130' and includes a first fitting end 132' attached to the grease fitting 86' and a second fitting end 134' attached to the second grease fitting 122' thereby permitting the grease fitting 86' and second grease fitting 122' to be in fluid communication. It should be appreciated that a skilled artisan may select other layouts, including the use of a single pipe to function as the grease fitting 86', the second grease fitting 122', and the supply pipe 84', as desired.

Advantageously, connecting the grease fitting 86' and the second grease fitting 122' permits the grease to travel to the second sheave 82' while feeding grease to the first sheave 80'. Desirably, this permits the user to grease both the first sheave 80' and the second sheave 82' on the waterside 42 of the spudwell 26, which traditionally would not be directly accessible by the user.

Advantageously, the spud greasing system 20 can permit the first sheave 80, 80' of the sheave assembly 28, 28' be greased without the entirety of the spud 22 being removed from the spudwell 26. In addition, and since the entirety of the spud 22 does not need to be removed from the spudwell 26, a separate crane is not required to grease the first sheave 80, 80' of the sheave assembly 28, 28'. The greasing can also be done at any work location without the spud barge 24 having to leave its station.

While certain representative embodiments and details have been shown for purposes of illustrating the invention, it will be apparent to those skilled in the art that various changes can be made without departing from the scope of the disclosure, which is further described in the following appended claims.

What is claimed is:

1. A spud greasing system comprising:
   a spudwell including a sleeve defining a window;
   a spud configured to be disposed in the sleeve of the spudwell, the spud including an access window;
   a sheave assembly disposed in the spud proximate the access window, the sheave assembly including:
     a housing,
     a sheave configured to be rotationally mounted in the housing,
     a supply pipe configured to be disposed on the housing, and
     a grease fitting configured to be in fluid communication with the supply pipe and the sheave, the grease fitting configured to transport grease from the supply pipe to the sheave; and
   a winch system including a guide pulley rotationally mounted on the spudwell and a cable,
   wherein the guide pulley is rotationally coupled to the sheave via the cable and the spud is configured to vertically move via the winch system between a deployed position and an undeployed position, and
   when the spud is in the undeployed position, the access window of the spud aligns and corresponds with the window of the spudwell such that the sheave of the sheave assembly is accessible via the access window of the spud and the window of the spudwell.

2. The spud greasing system of claim 1, wherein the spudwell includes a barge side and a water side, and the window of the sleeve is configured to face the water side.

3. The spud greasing system of claim 1 further comprising a second sheave configured to be rotationally mounted in the housing of the sheave assembly, wherein the second sheave is rotationally coupled to the guide pulley and the sheave via the cable.

4. The spud greasing system of claim 3, wherein the sheave is rotationally mounted at the front end of the housing, and the second sheave is rotationally mounted at the back end of the housing.

5. The spud greasing system of claim 3 further comprising a second grease fitting in fluid communication with the second sheave, the second grease fitting configured to receive grease from a grease supply and feed the grease to the second sheave.

6. The spud greasing system of claim 3 further comprising a second grease fitting configured to receive grease from a grease supply and feed the grease to the second sheave, wherein the second grease fitting includes a first end disposed at the back end of the housing, and when the spud is in the undeployed position, the grease supply is configured to be selectively connected to the first end of the second grease fitting.

7. The spud greasing system of claim 1, wherein the sheave assembly further includes a protrusion configured to receive and secure the grease fitting to the housing.

8. The spud greasing system of claim 7, wherein the supply pipe extends along an upper portion of the housing and partially down the second side of the housing.

9. The spud greasing system of claim 1, wherein the spud defines a cylindrical shape.

10. The spud greasing system of claim 1, wherein the spud defines a cylindrical shape having a diameter of at least one of 12 inches, 20 inches, or 24 inches.

11. A spud greasing system comprising:
    a spudwell including a barge side, a water side defining a window;

a spud configured to slidingly engage with the spudwell between a deployed position and an undeployed position, the spud including an access window configured to align and correspond with the window of the spudwell; and a sheave assembly mounted in the spud, the sheave assembly including:
  a housing having a front end and a back end disposed proximate the access window of the spud,
  a first sheave configured to be rotationally mounted proximate the front end of the housing,
  a second sheave configured to be rotationally mounted proximate the back end of the housing,
  a grease fitting configured to feed grease to the first sheave,
  a second grease fitting configured to feed grease to the second sheave, and
  a supply pipe having a first end disposed proximate the back end of the housing and a second end connected to the grease fitting, the supply pipe configured to transport grease from a grease supply to the grease fitting and the second grease fitting, wherein when the spud is in the undeployed position, the grease supply is configured to be selectively connected to the first end of the supply pipe through the window of the spudwell and the access window of the spud thereby supplying grease to the first sheave of the sheave assembly without removing the spud from the spudwell.

12. The spud greasing system of claim 11 further comprising a winch system mounted to the spudwell, the winch system including a winch drum configured to wind a cable.

13. The spud greasing system of claim 12, wherein the winch system includes a guide pulley rotationally mounted on the barge side of the spudwell, the guide pulley configured to be rotationally coupled to the first sheave and the second sheave via the cable and the spud is configured to vertically move via the winch system between the deployed position and the undeployed position.

14. The spud greasing system of claim 11, wherein the sheave assembly further includes a protrusion defining a channel configured to receive and secure the grease fitting to the housing.

15. The spud greasing system of claim 11, wherein the sheave assembly further includes a protrusion defining a second channel configured to receive and secure the second grease fitting to the housing.

16. The spud greasing system of claim 11, wherein the sheave assembly further includes a pipe having a first fitting end and a second fitting end, the first fitting end attached to the grease fitting and the second fitting end attached to the second grease fitting thereby permitting the grease fitting to be in fluid communication with the second grease fitting.

17. The spud greasing system of claim 11, wherein the sheave assembly further includes a protrusion defining a tunnel and a pipe disposed in the tunnel, the pipe configured to connect the grease fitting and the second grease fitting thereby permitting grease to travel to the second sheave.

18. The spud greasing system of claim 11, wherein the supply pipe extends along an upper portion of the housing and partially down the second side of the housing.

19. The spud greasing system of claim 11, wherein the first end of the supply pipe includes an attachment device configured to be attached to the grease supply.

20. The spud greasing system of claim 11, wherein each one of the first sheave and the second sheave includes a cavity configured to receive the grease.

* * * * *